US011122441B2

(12) United States Patent
Hassan et al.

(10) Patent No.: US 11,122,441 B2
(45) Date of Patent: Sep. 14, 2021

(54) ANOMALOUS ACCESS POINT DETECTION

(71) Applicant: Microsoft Technology Licensing, LLC, Redmond, WA (US)

(72) Inventors: Amer A. Hassan, Kirkland, WA (US); Roy Kuntz, Redmond, WA (US); Michael Davis, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 16/003,846

(22) Filed: Jun. 8, 2018

(65) Prior Publication Data
US 2019/0380043 A1 Dec. 12, 2019

(51) Int. Cl.
*H04W 16/18* (2009.01)
*H04W 64/00* (2009.01)
*H04B 17/318* (2015.01)
*H04W 88/08* (2009.01)

(52) U.S. Cl.
CPC .......... *H04W 16/18* (2013.01); *H04B 17/318* (2015.01); *H04W 64/003* (2013.01); *H04W 88/08* (2013.01)

(58) Field of Classification Search
CPC .... H04W 16/18; H04W 64/003; H04W 88/08
See application file for complete search history.

(56) References Cited

U.S. PATENT DOCUMENTS

| | | | | |
|---|---|---|---|---|
| 10,652,698 B1* | 5/2020 | Lange | ............. | H04W 12/00503 |
| 2007/0186276 A1* | 8/2007 | McRae | ............... | H04L 63/1408 |
| | | | | 726/4 |
| 2015/0172289 A1* | 6/2015 | Kwon | ................... | H04W 12/08 |
| | | | | 726/3 |
| 2016/0006989 A1* | 1/2016 | Swanson | ............... | H04L 67/125 |
| | | | | 348/151 |
| 2019/0130019 A1* | 5/2019 | De | ...................... | H04L 61/6022 |

FOREIGN PATENT DOCUMENTS

WO  2009149417 A1  12/2009

OTHER PUBLICATIONS

"International Search Report and Written Opinion Issued in PCT Application No. PCT/US2019/034775", dated Aug. 21, 2019, 12 Pages.
Tang, et al., "Exploiting Wireless Received Signal Strength Indicators to Detect Evil-Twin Attacks in Smart Homes", In Journal of Mobile Information Systems, vol. 2017, Jan. 17, 2016, 14 Pages.
Yang, et al., "Active User-Side Evil Twin Access Point Detection Using Statistical Techniques", In Journal of the IEEE Transactions on Information Forensics and Security, vol. 7, Issue 5, Oct. 1, 2012, pp. 1638-1651.

* cited by examiner

*Primary Examiner* — Kevin C. Harper
*Assistant Examiner* — Derrick V Rose
(74) *Attorney, Agent, or Firm* — Schwegman Lundberg & Woessner, P.A.

(57) ABSTRACT

Disclosed in some examples are methods, systems, devices, and machine-readable mediums that detect evil twin and other anomalous access points in an IT infrastructure by detecting access points that are not in their expected locations based upon an analysis of access point reports from one or more computing devices.

18 Claims, 8 Drawing Sheets

ANOMALOUS ACCESS POINT DETECTION

BACKGROUND

With the advent of the digital age, billions of dollars in research and development, marketing, and sales are increasingly documented and stored as electronic data. Data thieves such as hackers and attackers have devised increasingly sophisticated methods of stealing and/or vandalizing this valuable data. One such exploit is called an "evil twin" where attackers setup their own access point that they control that impersonates a legitimate access point to trick unsuspecting devices into connecting to their access point instead of the legitimate access point. Once a device is connected to the evil twin, the device's communications and data may be vulnerable to access by those attackers. Worse, the attackers may utilize the evil twin as an attack vector to deliver a malicious payload to the unsuspecting device.

An evil twin access point impersonates a legitimate access point by copying the identifier of the legitimate access point. For example, the evil twin may copy and broadcast a MAC address and/or SSID of the legitimate access point on the network. Because the evil twin is designed to blend in with legitimate network infrastructure, they are often difficult for network administrators to discover. The evil twin may also periodically shift which legitimate access point it is impersonating to further frustrate detection attempts. Finally, the evil twin may be transitory—that is, the nefarious user behind the evil twin may leave the area with the evil twin to avoid detection after securing the information they are looking for. The difficulty in mitigating these attacks is exacerbated in large corporate environments where there may be hundreds or thousands of access points to monitor over a large area.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
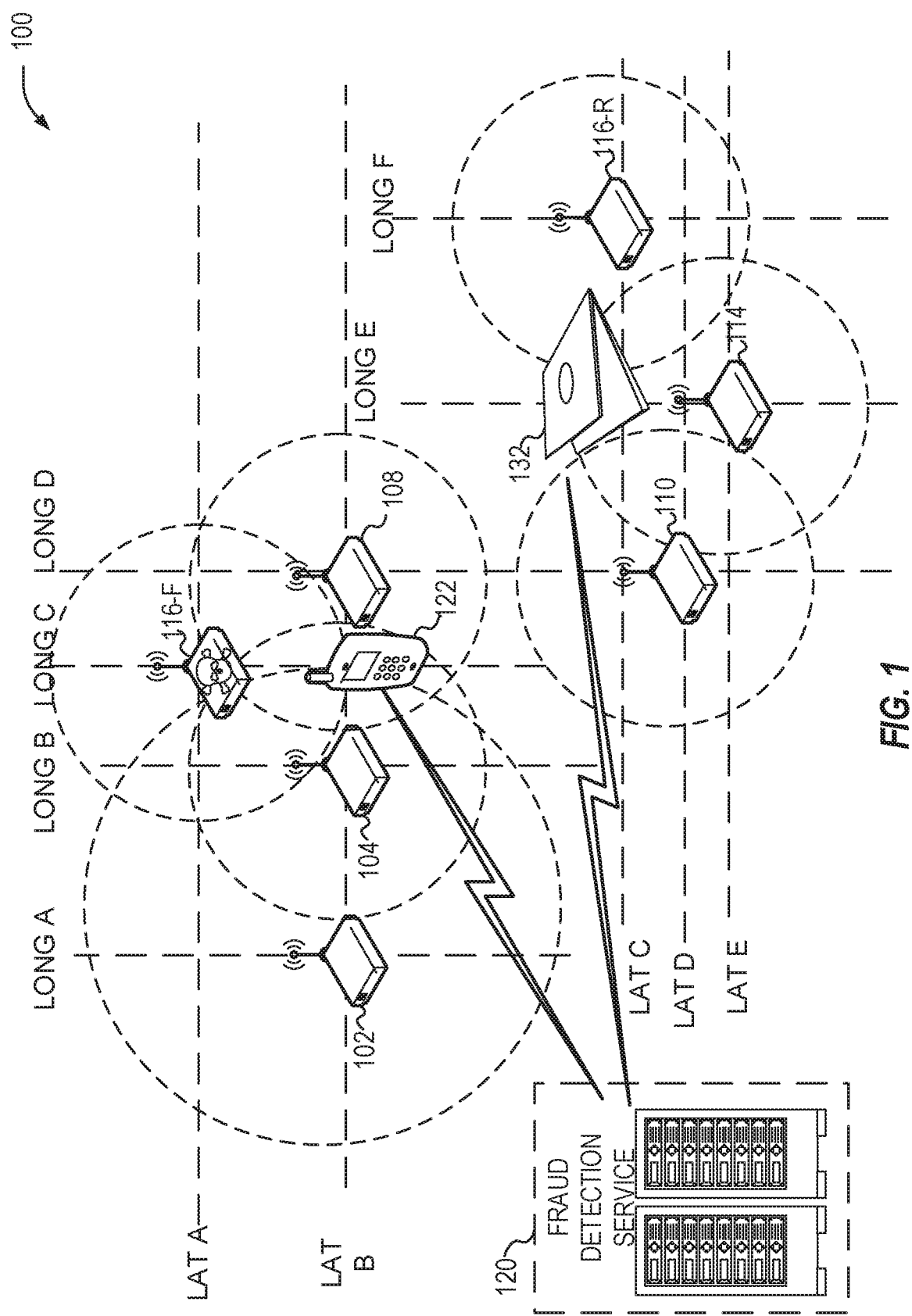
FIG. 1 illustrates an example use case of a fraud detection service according to some examples of the present disclosure.

Disclosed in some examples are methods, systems, devices, and machine-readable mediums that detect evil twin and other anomalous access points in an IT infrastructure by detecting access points that are not in their expected locations based upon an analysis of access point reports from one or more computing devices. Computing devices may be end user computing devices that send access point reports to a network-accessible fraud detection service as they move from place to place or as they scan for access points. The reports may comprise a list of access points scanned by the computing devices and in some examples, measurements of the radio signal broadcast from those access points and/or the location of the computing device.

The fraud detection service may maintain access point positioning data that describes positioning information (such as an expected position) of each access point in the network. The positioning data of each access point may be a specific location such as geolocations or may be less specific locations such as probabilities of observing a particular access point given that one or more other access points are observed. The positioning data may be entered by an administrator or created automatically from a plurality of reports from a plurality of computing devices. Based upon the access point reports and the positioning data, the fraud detection service may determine that an observed location of an access point does not match an expected location of the access point. Access points where the observed location does not match an expected location may be flagged as potentially anomalous (e.g., the identification seen may indicate an evil twin is operating on the network). Computing devices that provide reports may be wireless stations or other access points.

In some examples, the reports sent by the computing devices may include measurements of the radio channel between the computing devices and the access points as well as a geolocation of the computing device. Using these measurement reports, the system may calculate observed locations of the access points visible to a computing device. To determine these locations, multiple computing devices may send reports to a fraud detection device. Each report may include the location of the computing device (e.g., obtained from a Global Navigation Satellite System (GNSS) such as a Global Positioning System (GPS) sensor, or other location based technology), the list of access points that are visible from the computing device, and a measurement of the signal or channel between the computing device and the access point (e.g., a Received Signal Strength—RSSI—a round trip time (RTT), and the like). Using these reports the fraud detection service may utilize trilateration to determine an observed position of the access points. The observed locations of the access points may be compared to an expected location from the access point positioning data. The expected location may be entered by an administrator or determined through reports from users during an initial learning period when the system (or an access point) comes online. For each visible access point a variance of the observed position to the expected position that is greater than a threshold may be flagged as anomalous.

In other examples, the reports may not include the measurements of the radio channel between the computing device and the visible access points. The location of the computing device in the report may be utilized to create a set of access points from the access point positioning data that are likely to be visible from the location of the computing device. Access points that are visible but are not in the set of access points that are likely to be visible may be flagged as potentially anomalous. The set of access points that are likely visible may be created in a number of ways. For example, by including access points in the list of access point locations that are within a threshold distance of the computing device.

In other examples, the report may not include the measurement data or the position of the computing device. The access point positioning data may include data that allows for determining a probability that a given access point is visible given a set of other visible access points (e.g., access point co-occurrence). The access point positioning data may be created based upon past reports from computing devices. The current set of visible access points may be utilized along with the access point positioning data to calculate a set of current probabilities. For example, if a computing device reports access points A, B. C, and D as visible from the computing device's current location, the system may calculate the probabilities of: seeing A given B. C, and D (e.g., P(A|B,C,D); seeing B given A. C, and D (e.g., P(B|A,C,D); seeing C given A. B, and D (e.g., P(C|A,B,D); seeing D given A, B, and C (P(D|A,B,C)). Any probability of seeing a particular access point that is below a threshold probability may cause the particular access point to be flagged. Thus, if P(C|A,B,D)<threshold, C may be labeled as anomalous.

In still other examples, the reports may include the positioning of the computing device, no measurement data, and the access point positioning data may include geolocations. The fraud detection system may calculate a center access point (e.g., a centroid of the cluster of access points reported as visible) of the set of visible access points and a set of expected access points may include all access points in the set of access points that are within a predetermined threshold distance of the center access point. Access points in the visible set of access points but not the expected set may be flagged as potentially anomalous.

For situations in which the computing device cannot position itself (e.g., in a building or other structure), but can provide measurement data and where the access point positioning data includes geolocations, the fraud detection system may calculate a position by iteratively using all combinations of three of the set of visible access points in a trilateration algorithm. A particular access point that is not where it is expected to be may be determined based upon an error of the trilateration equations such as where the trilateration does not converge on a solution, or where the error exceeds a threshold. For example, if A, B, C. and D are visible to the computing device, and the solutions for A, B, and C converge (or the error is acceptable), but the solutions for any trilateration involving D do not converge or have error that is above a threshold may indicate that D is anomalous.

In some examples, the error may be based upon the trilateration equations, but in other examples, the error may be based upon the positions calculated by the fraud detection system. For example, if A, B. C, and D are visible, then there are four combinations of three access points: (A, B, C); (A, B. D); (A, C. D); (B,C,D). A position may be calculated using trilateration for each combination of three access points. An average or centroid position among the four positions may be calculated and the error may be the distance between each position and the average or centroid. If this distance exceeds a threshold the access point may be labeled as anomalous.

As previously noted, the access point positioning data may store specific locations (e.g., a specific geolocation, a building, an address, or the like) or may store relative locations (e.g., access points A and B are near each other, or probabilities of access point co-occurrences). The access point locations may be input by an administrator (e.g., a table of access point identifiers and locations), may be determined by crowd-sourced scans taken by computing devices, and the like. For example, as computing devices (STA or other APs) scan for other access points, they may send reports of the list of access points that are visible to the fraud detection service. The fraud detection system may use these scans to train a model that determines probability associations or clusters that indicate the probability that an access point would be visible given that other access points are visible.

Additionally, other indicators of anomalous access points may be monitored, such as multiple access points with the same identifier seen in a scan. For example, if the computing device determines that multiple access points having a same identifier are present in the scan, the fraud detection service may mark both as potentially anomalous.

In some examples, a fraud score may be tabulated for each access point. Every time the access point is marked as anomalous, the fraud detection system may increase the fraud score of the associated access point identifier. If the fraud score passes a particular threshold fraud score the access point may be labelled as compromised and corrective action may be taken.

In some examples, the fraud detection service may take one or more confirmation actions upon determining that an AP is anomalous or compromised. For example, through wired communication with the legitimate access point with the same identifiers as the anomalous or compromised AP, the fraud detection service may request the legitimate AP to broadcast a code in its beacon. The computing device that reported the anomalous AP may be requested to scan for the beacon from the potentially anomalous AP and may pass the beacon or code to the fraud detection service. The code may be a random number, an OAUTH code (either Time Based One-Time Password Algorithm (TOPT) or HMAC-based One-Time Password Algorithm (HOTP)), a digital signature (signed with the access point's private key) or the like. If the code matches the code that is expected, the access point may be labelled as not anomalous. The access point positioning data may be updated to include this location to prevent future reports from labelling the access point as potentially anomalous. If the code does not match the code that is expected (or does not include the code), the fraud detection service may label the access point as anomalous.

Example corrective actions include changing an identifier (SSID, MAC address, or both) on the legitimate access point. This is accomplished by the fraud detection service contacting the legitimate access point using a known internal network address of the legitimate access point nodes (e.g., a wired Internet Protocol (IP) address). The legitimate access point may then switch to a new SSID and/or MAC address and new whitelists with the updated SSID and MAC address may be sent out to computing devices to prevent any devices from connecting to the rogue access point. In other examples, the access point identifier may be blacklisted until the rogue access point is removed.

In some examples, the determination of whether an access point is anomalous may be done on a fraud detection service in the network based upon reports from computing devices—such as mobile devices using the access points. In other examples, the computing devices may be other access points. In still other examples, the determination of whether the access point is anomalous may be done in a distributed. P2P manner by the computing devices themselves. For example, the computing devices may receive a periodically updated list of expected access point locations. The computing device may compare its location to the list to determine which access points are expected at a particular location. If the computing device detects an access point that is not in the expected location, or detects access points with duplicate identifiers, it may refuse to connect to those access points and may send a report to a fraud detection service (which may then warn other devices). Reports from computing devices may be sent periodically (e.g., every predetermined amount of time) or may be sent when a certain percentage of access points that are visible changes, or when a new access point becomes visible.

In some examples, in addition to updating the white lists, upon determining that an access point is anomalous or potentially anomalous, the fraud detection service may instruct the computing device to disconnect from the anomalous access point, if the computing device was connected to the anomalous access point. The computing device may be configured to prevent any network access or any access to any unencrypted sites prior to receiving an indication from the fraud detection service that the access point it has connected to is not suspected to be anomalous.

The present disclosure thus solves a problem with computer networking in which access points are easily impersonated by malicious actors. These malicious actors setup an access point with a same identity as a legitimate access point in order to steal data from unsuspecting client computing devices. This problem is solved by utilizing the client devices as network scanners that pass reports of visible access points (and other information) to a fraud detection service that compares expected locations of access points to the actual access point locations as observed by computing devices that are utilizing the network. The fraud detection system thus improves the security of the computing system by detecting and responding to threats such as evil twin access points without costly or difficult signal monitoring operations by an IT support professional. As previously noted, the locations of the access points are determined through observed scanning by computing devices and provided to a network-accessible fraud detection service. Once threats are found, the system may take technical measures to eliminate false alarms and to protect network users from those threats. The disclosed techniques improve the functioning of the computer system by securing the network from intrusions. The disclosed techniques are fundamentally rooted in computing technology—specifically the field of network security. As used herein, access points which potentially have evil twin access points operating using a same identity nearby are termed anomalous access points.

FIG. 1 illustrates an example use case 100 of a fraud detection service 120 according to some examples of the present disclosure. Computing device 122, shown as a cellular telephone, may move throughout a corporate or other network provided by various access points such as network access points (APs) 102, 104, 108, 110, 114, and 116-R. Anomalous access point 116-F may impersonate legitimate access point 116-R by broadcasting a same identity. For example, by broadcasting a same beacon frame, utilizing a same Media Access Control (MAC) address, and/or a same Service Set Identifier (SSD). While computing device 122 may have been provisioned with a white list of permissible access points, that white list may utilize identities of access points, which as noted, may be impersonated by 116-F. Should computing device 122 connect to access point 116-F, the data sent over any network connection provided by 116-F may be compromised.

Computing device 122 may scan for beacons broadcast by the access points. The computing device 122 may then connect to one of the access points through an association and authentication process (e.g., as outlined by the Institute for Electrical and Electronics Engineers (IEEE) 802.11 family of standards). After connecting to the access point, software on the computing device 122 may restrict network access to applications on the computing device temporarily.

The computing device 122 may establish an encrypted tunnel and send an access point report with scan results showing nearby access points to the fraud detection service 120. In some examples, the access point report may include a geolocation of the computing device 122 and/or measurements of a radio signal from the access points. The fraud detection service may utilize the information provided by the computing device 122 to determine an observed location (according to one or more computing devices) of the access points in the report. This may be utilized by the fraud detection service along with the access point positioning data that indicates the expected locations of the access points.

The fraud detection service 120 may store a plurality of reports from a plurality of computing devices, including computing device 122 for later use to detect anomalous access points. For example, the computing device 122 may provide the fraud detection service 120 its geolocation, measurement data, and the scan results. The fraud detection service 120 may utilize stored one or more other previously received reports from other computing devices to calculate a location of the access points that were scanned by the computing device 122.

For example, the computing device 122 may receive beacon frames from access points 102, 104, 108, and 116-F. Based upon measurements taken of these signals by the computing device (e.g., a RSSI, a round trip time, a time of flight measurement, or the like) and the geolocation of the computing device 122, the fraud detection service may compute a distance between the computing device and each access point. Using additional reports from additional computing devices, the fraud detection service 120 may employ a trilateration algorithm to calculate an observed position of the access points.

In some examples, to differentiate between sightings by the computing devices of legitimate access points and anomalous access points, the stored reports may be clustered based upon the location of the computing device. For example, reports from computing devices that are within a locational proximity of each other may be clustered. This allows the trilateration algorithm to compute a solution by preventing reports from the legitimate access points and reports of the anomalous access point being used at the same time in the equations (and thus preventing the trilateration algorithm from computing a solution). In other examples, instead of the clustering algorithm, the inability to compute a solution may be used as evidence that the access point is anomalous.

For example, a report from computing device 122 as stored by the fraud detection service 120 may be:

| Mobile Position Cluster | Access Point ID | Measurement Results (RSSI) |
|---|---|---|
| A | 102 | 30 |
| A | 104 | 50 |
| A | 108 | 75 |
| A | 116 | 47 |

Another computing device within a predetermined proximity to the computing device 122 may also be in a position cluster A, and the measurements of the signals taken by that computing device may be utilized along with the measurements of computing device 122 to calculate a position of the access points. Another position cluster, position cluster B is represented by computing device 132, which is shown as a laptop computing device. Computing device 132 may also provide reports to the fraud detection service 120. Computing device 132 may provide its location and a list of the access points it sees (access points 110, 114, and 116-R) and in some examples the measurements of the signals received from the access points. The fraud detection service may utilize the location of the computing device 132 to determine that computing device 132 is in a location cluster B. The report from computing device 132 may be stored as:

| Mobile Position Cluster | Access Point ID | Measurement Result (RSSI) |
|---|---|---|
| B | 110 | 48 |
| B | 114 | 47 |
| B | 116 | 55 |

Using reports from other computing devices in cluster A together with the report from computing device 122, the fraud detection system may produce access point positioning information of:

| Access Point ID | (Lat, Long) |
|---|---|
| 102 | (B, A) |
| 104 | (B, B) |
| 108 | (B, D) |
| 116 | (A, C) |

Fraud detection service may conclude that the position of AP 116 at Latitude A and Longitude C is not consistent with the position as specified in the access point positioning data. For example, the access point positioning data may be:

| Access Point ID | Latitude | Longitude |
|---|---|---|
| 102 | B | A |
| 104 | B | B |
| 108 | B | D |
| 110 | D | D |
| 114 | E | E |
| 116 | C | F |

When computing device 122 reports an access point identifying itself as access point 116, the fraud detection service may determine that its position does not match the expected position of an access point with these identifiers and may label it as potentially anomalous.

While the above description utilized computing device positions and measurements to determine access point locations, in other examples, other methods may be utilized. For example, the computing device may not report its position, but may report the identifiers of access points that it sees and the measurements of the radio signals of these access points. In FIG. 1, computing device 122 would report the identifiers of access points 102, 104, 108, and 116-F. Similarly, computing device 132 would report identifiers of access points 110, 114, and 116-R.

The fraud detection service may utilize the access points visible to the computing device and the measurements to determine what other access points should be visible to the computing device based upon the access point positioning data. For example, a position of the computing device may be ascertained from the measurements and the known positions of the access points from the access point positioning data. In the case of a fraudulent access point, one or more measurements may be incorrect—that is, the distance between the location of the access point from the access point positioning data may be different than the distance measured (as it is actually measuring a distance to an imposter).

In some examples, each combination of three distances and access point locations for all visible access points may be computed using trilateration. The position of the computing device may be the position that has the least amount of error (or that actually produces a position solution). The fraud detection system may identify that particular access points that cause high error, or cause the position not to converge in the trilateration equations, by correlating common access points in the various high error or non-converging solutions. For example, if the access point combination of APs 102, 104, and 108, when combined in a trilateration equation produce a solution, but when utilizing access point 116-F, the system may not be able to produce a solution (or may produce a solution with a high error) to the trilateration equation. Access points that cause failures to position the computing device may be marked as anomalous.

In other examples, the fraud detection service may use only the visible access points communicated by the computing device. The access point positioning data may be a model that, when given a list of one or more visible access points, outputs a probability that another given list of one or more access points would be visible. In this example, the computing device may calculate the probabilities of each visible access point given all other visible access points and then those probabilities that are below a predetermined threshold may be labeled as potentially anomalous. This model may be created based upon a plurality of reports from a plurality of other computing devices.

For example, in FIG. 1, the computing device 122 sees access points 102, 104, and 108, and 116. These access point identifiers may be reported to the fraud detection service. The fraud detection service may produce a list of probabilities $P(x|y)$ for each access point reported as visible. $P(x|y)$ in probability notation is the probability of x given y. So the probabilities calculated may be P(102|104, 108, 116), P(104|102, 108, 116), P(116|102, 104, 108), P(108|116, 104, 102). As noted these probabilities may be calculated using other reports from other computing devices in the same area as computing device 122. The P(102|104, 108, 116), P(104|102, 108, 116), and P(108|116, 104, 102) may be greater than a lower threshold as these APs are often reported together and so AP 102, 104, and 108 may not be marked anomalous. However, P(116|102, 104, 108) may be low as AP 116 may not be reported often with APs 102, 104, and 108. Indeed, AP 116 would more likely be reported with AP 110, and AP 114. AP 116-F may be labelled as anomalous.

In examples in which the access point positioning data is a geolcation, a threshold distance may be utilized from a central access point reported by the computing device. The central access point may be determined by clustering the set of visible access points based upon the location in the access point positioning data and taking a centroid. For example, in FIG. 1, a distance threshold from access point 104 may be utilized. Any access point that has a location in the access point positioning data that is over a determined threshold distance from this central access point may be considered potentially anomalous.

Figure 2:
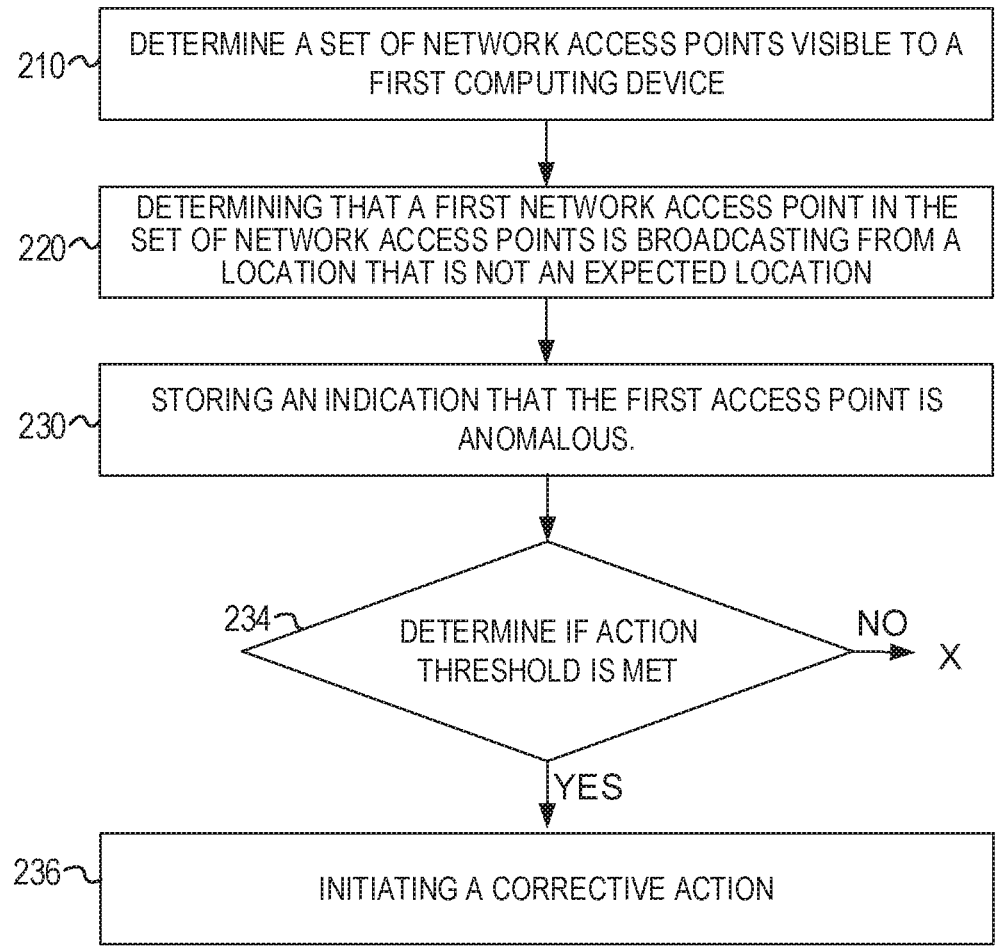
FIG. 2 illustrates a method of a detecting an anomalous access point according to some examples of the present disclosure.

Turning now to FIG. 2, a method 200 of a detecting an anomalous access point is illustrated according to some examples of the present disclosure. Method 200 may be performed by a fraud detection service, a computing device, or the like. At operation 210, a set of network access points visible to a first computing device may be determined. For example, the computing device may scan one or more frequencies for beacon or other broadcast frames that advertise access points. These beacon frames may include an access point identifier or identifiers such as a Service Set Identifier (SSID), a MAC address of the access point, and the like. In some examples, in addition to scanning one or more channels for one or more access points, the computing device measures a metric corresponding to the channel that is indicative of a distance between the computing device and the access point. For example, a received signal strength, a round trip time, a time of flight measurement, or the like.

At operation 220, the system may determine that a first network access point in the set of network access points is broadcasting from a location that is not an expected location the system may determine that a particular access point is not broadcasting from an expected location. This determination may be based upon the set of network access points visible to the first computing device and access point positioning data describing position information of the set of access points visible to the first computing device. This may be done for example, by utilizing one of the previously discussed methods utilizing the set of access points visible to the computing device. FIGS. 3-7 describe additional methods for performing operation 220. Each of the methods of FIGS. 3-7 may utilize different information available to the system, such as different types of access point positioning data and whether measurement and/or computing device locations are available. At operation 230, the system may store an indication that the first access point is anomalous. For example, a data structure may store one or more of: the access point identifier, how many times they have been reported as anomalous, when it was reported, and other information about the report, including data used to make the decision (e.g., the contents of the report from the computing device), and the like.

A determination is made at 234 whether an action threshold is met. For example, the indication may be a fraud score that may be incremented each time the access point is detected as anomalous. When the fraud score exceeds a determined threshold score, the action threshold may be met. In some examples, the threshold may be a single report, in which case the check at operation 234 may be optional. In other examples, the threshold may be more than one report. At operation 236, the fraud detection system may initiate one or more corrective actions. Examples of corrective actions include adding the particular access point to a blacklist, instructing the legitimate access point to change its identifier, performing a denial-of-service attack on the illegitimate access point, instructing computing devices to utilize a Virtual Private Network (VPN) when connecting to an access point matching the identifier of the particular access point labeled as anomalous, or any other measure designed to prevent computing devices from connecting to the illegitimate access point or having their data compromised.

Figure 3:
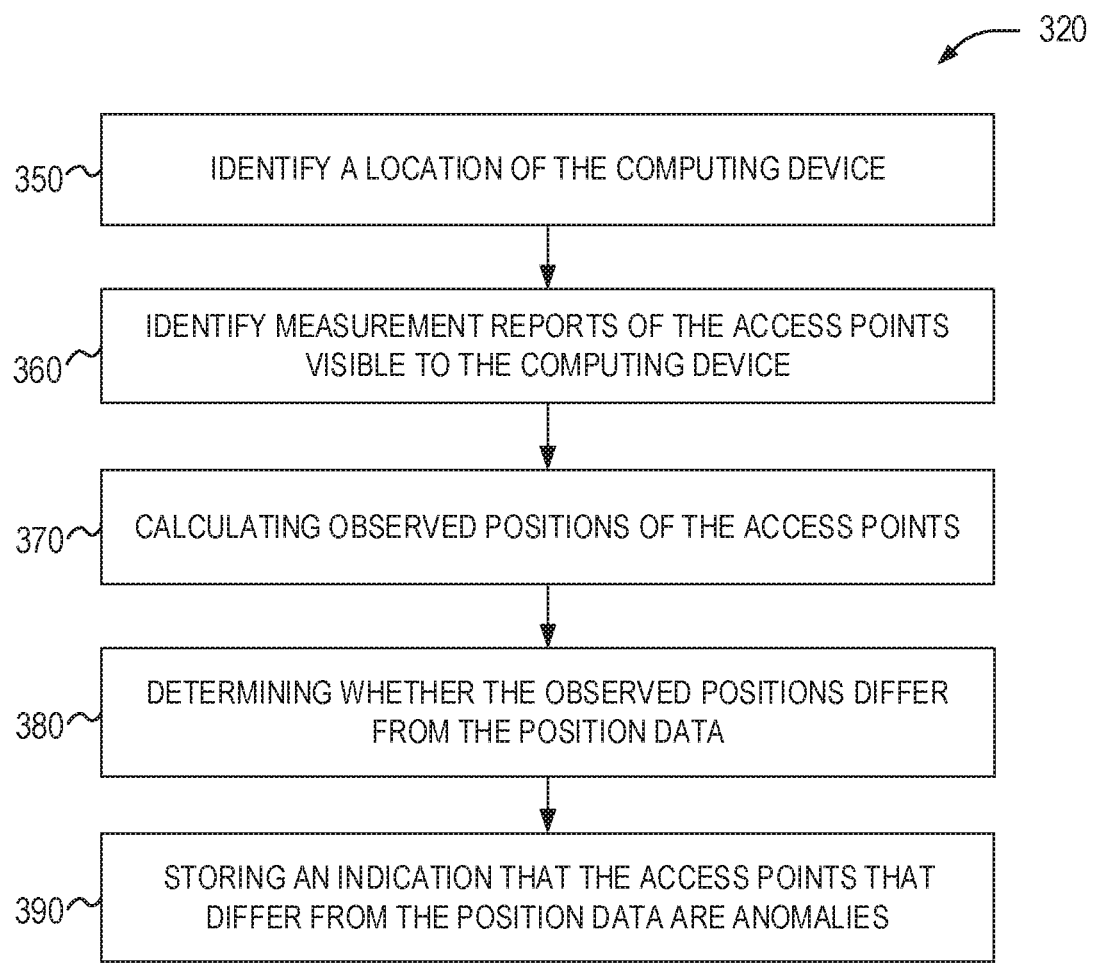
FIGS. 3-7 illustrate various flowcharts of methods of determining that a first network access point in the set of network access points is broadcasting from a location that is not an expected location according to some examples of the present disclosure.

FIG. 3 illustrates a flowchart of a method 320 of determining that a first network access point in the set of network access points is broadcasting from a location that is not an expected location according to some examples of the present disclosure. Method 320 is one example method of operation 220. At operation 350 a location of the computing device may be identified. For example, the computing device may utilize a Global Navigation Satellite System (GNSS) to determine its geolocation. The geolocation of the computing device may be provided to the fraud detection service in the reports along with the set of visible access points. At operation 360 the system may identify measurement reports of the access points visible to the computing device. In some examples, the measurements may be collected during the access point scanning. In other examples, the computing device may temporarily connect to the access points to collect the measurements. Example measurements include a Received Signal Strength Indicator (RSSI). Round Trip Time (RTT), and the like.

At operation 370 the system may, for one or more access points in the set of visible access points, determine observed positions of the access points. For example, using the measurements determined at operation 360 and a plurality of other measurements from other computing devices, a distance between at least three computing devices and each access point may be determined. This distance may be utilized as input to a trilateration algorithm that outputs an observed position of the access point.

At operation 380 the system may determine whether any observed access point positions differ from that of the access point position data. The difference may utilize a threshold to allow for some natural variance as the observed location may not be as accurate as that determined and stored in the access point position data. For example, a threshold difference may be employed such that if a difference between the observed and expected locations (from the access point position data) differ greater than the threshold, the access point may be labeled as anomalous. At operation 390, access points whose observed location and expected location differ by an amount greater than the threshold may be marked as anomalous.

Figure 4:
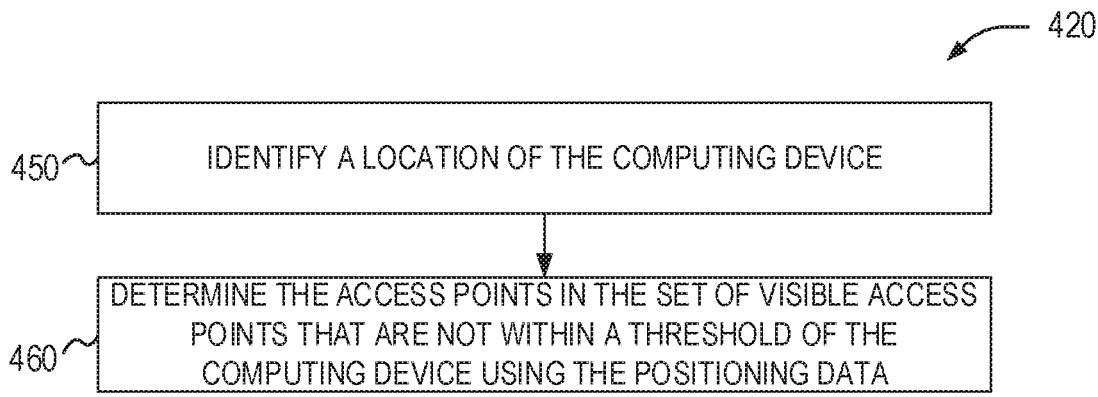

FIG. 4 illustrates a flowchart of a method 420 of determining that a first network access point in the set of network access points is broadcasting from a location that is not an expected location according to some examples of the present disclosure. Method 420 is one example method of operation 220. The method of FIG. 4 may be utilized in examples in which the computing device's position is known, the access point positioning data comprises geolocations of where the access points were deployed, and where the computing device does not supply measurement data. At operation 450 the system may identify a location of the computing device. For example, the computing device may utilize a GNSS, calculate its location using a cellular positioning method, inertial navigation, or the like. At operation 460, the system may determine the set of one or more access points using the access point positioning data that is within a threshold distance radius from the computing device's reported position. Any access point that is reported by the computing device that is not in this set may be labeled anomalous. The threshold may be set by an administrator, or the like. The threshold may be specific to particular areas and may be adjusted up or down based upon detection of false positives (e.g., by the confirmation processes discussed).

Figure 5:
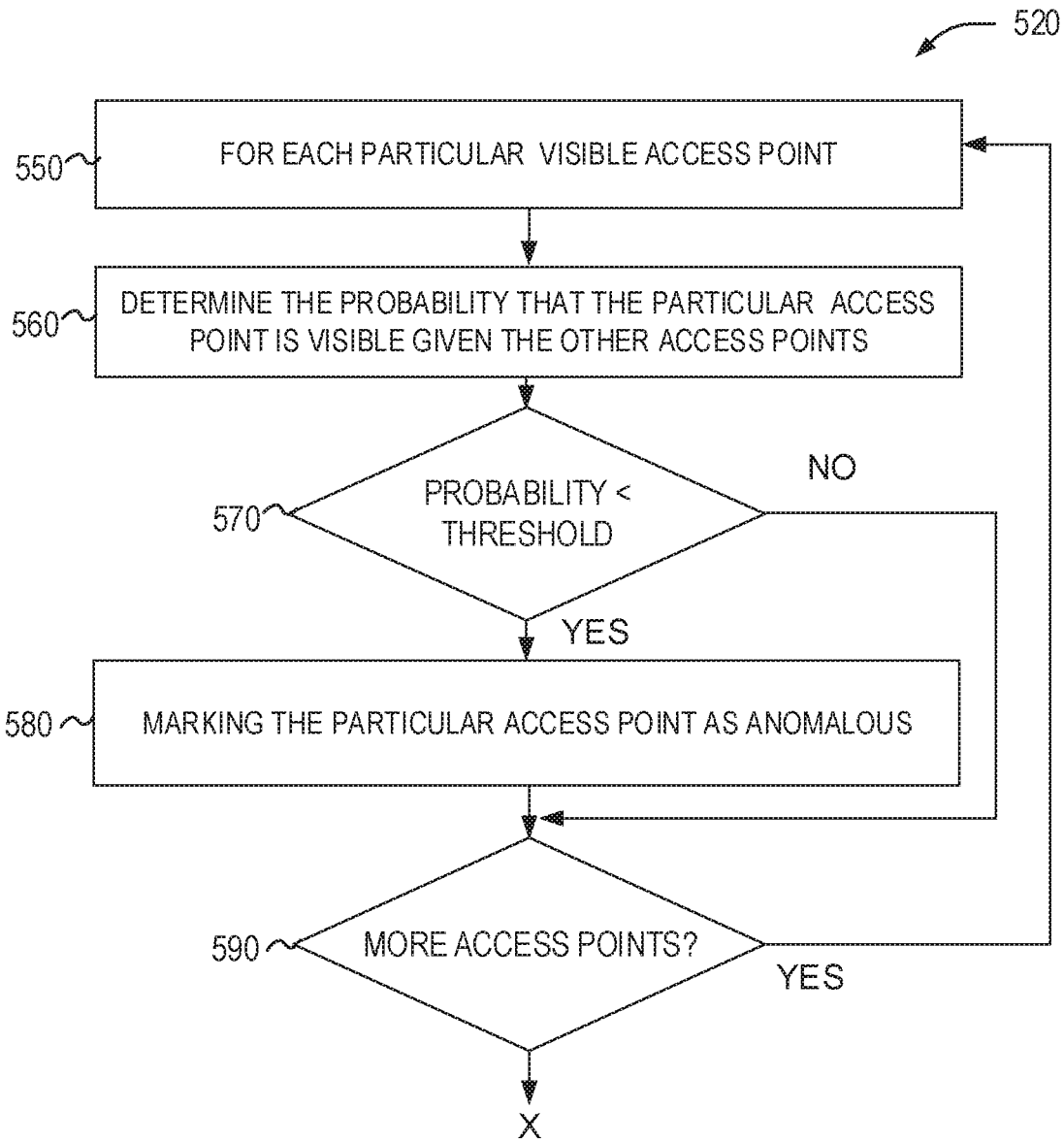

FIG. 5 illustrates a flowchart of a method 520 of determining that a first network access point in the set of network access points is broadcasting from a location that is not an expected location according to some examples of the present disclosure. Method 520 is one example method of operation 220. In the example of FIG. 5, the system does not have, or utilize, the computing device's location, measurements, or geolocations of the access points in the access point positioning data. In the example in FIG. 5, the access point positioning data comprises a probability model that outputs a probability of a computing device seeing a particular access point given that other access points are visible. Prior to the operations of FIG. 5, the system determines the probability model from a plurality of reports of computing devices. For example, each time a group of access points is visible together, the probability of seeing one of the group when the other is visible is increased.

At operation 560 the system may utilize the determined probabilities of the access point positioning data to determine the probability that a particular access point would be visible based upon the presence of the other access points. At operation 570, if the probability is lower than a defined threshold, the system may mark the particular access point as anomalous at operation 580. The threshold may be set by an administrator. In some examples, the threshold may be adjusted up or down based upon the results of any confirmation methods utilized as described above. Thus, for example, if an access point is marked as anomalous but is confirmed by one of the confirmation methods above, the system may decrease the probability threshold. In other examples, if the system does not mark an access point as anomalous and it turns out to be anomalous then the system may lower the threshold. At 590, if additional access points are present in the list of visible access points, then control may pass to operation 550 to process the next access point in the list of visible access points.

Figure 6:
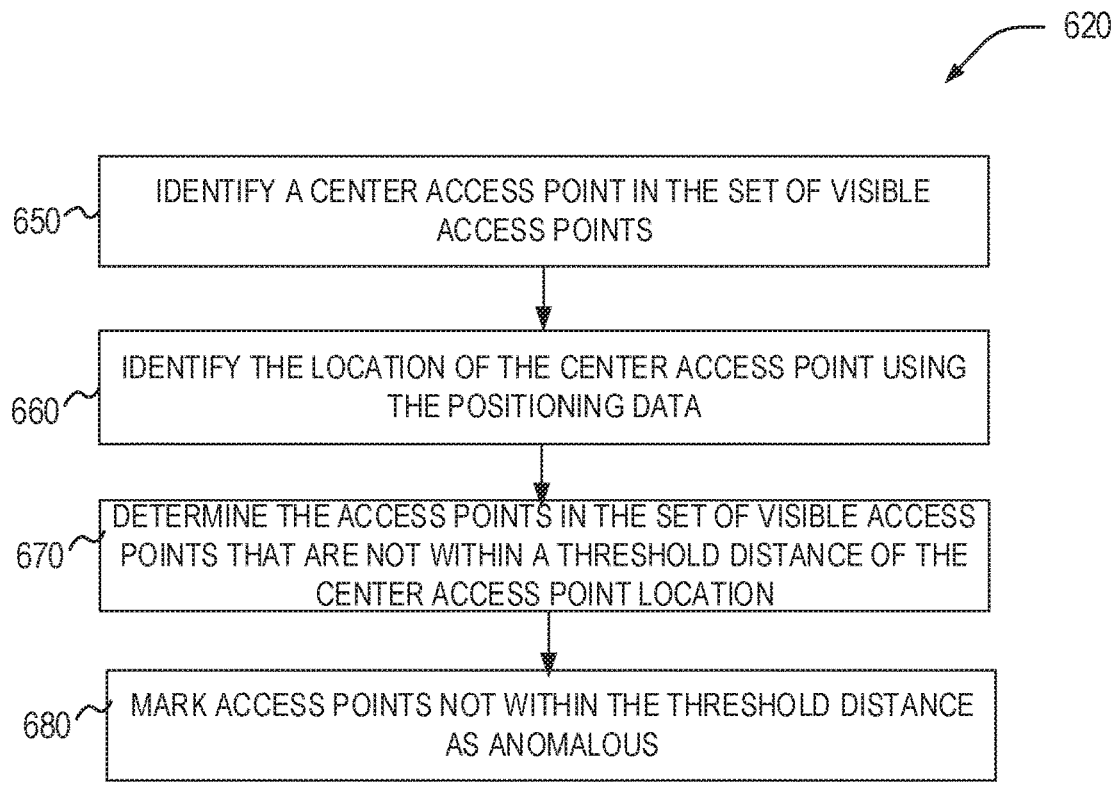

FIG. 6 illustrates a flowchart of a method 620 of determining that a first network access point in the set of network access points is broadcasting from a location that is not an expected location according to some examples of the present disclosure. Method 620 is one example method of operation 220. In the example of FIG. 6, the system may have access to geolocation data of the access points, but not geolocation data of the computing device or measurement data. At operation 650, the system may determine a center access point in the list of visible access points. For example, the access points may be clustered based upon location (e.g., using a k-nearest clustering algorithm). The system may determine a centroid of the cluster and the access point nearest the centroid may be utilized as the center access point.

At operation 660 the system may identify the location of the center access point using the access point positioning data. At operation 670, the system may determine access points in the set of visible access points that are not within a threshold distance of the center access point position. These access points may be marked as anomalous by the system at operation 680.

Figure 7:
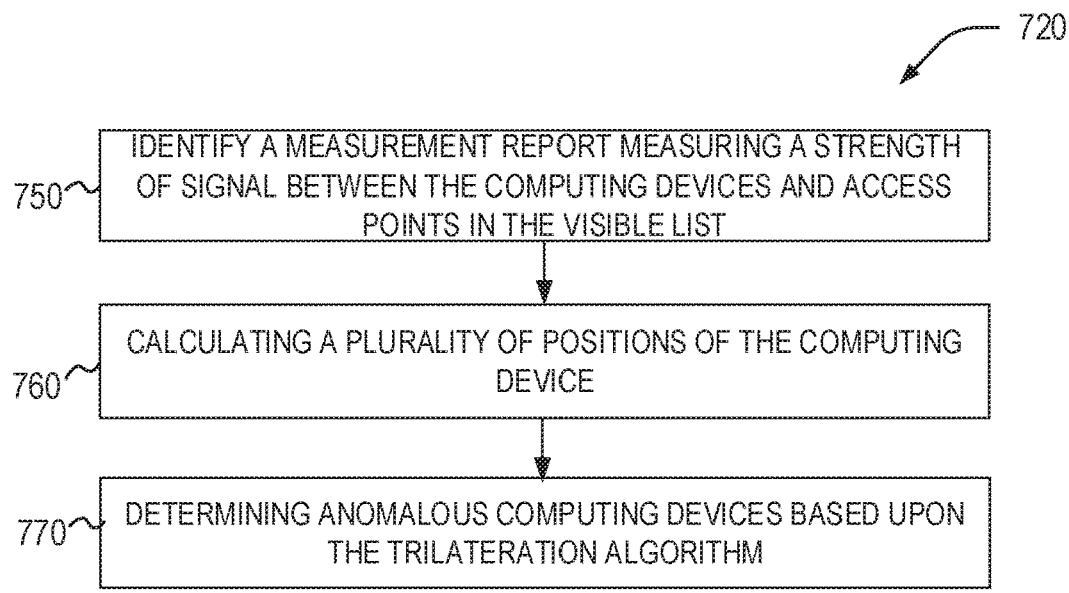

FIG. 7 illustrates a flowchart of a method 720 of determining that a first network access point in the set of network access points is broadcasting from a location that is not an expected location according to some examples of the present disclosure. Method 720 is one example method of operation 220. In the example of FIG. 7, the system may have access to geolocation data of the access points and measurement data, but not geolocation data of the computing device. At operation 750 the system may identify a measurement report measuring a strength of signal between the computing device and access points in the visible list. At operation 760, the system may utilize the measurements along with the access point positioning data to attempt to geolocate the computing device using a trilateration algorithm using various combinations of three access point measurement and location data. The trilateration algorithm may not compute a position when an anomalous node is included in the calculation or an error may be above a predetermined threshold. In these cases, the node that causes the failure may be marked as anomalous at operation 770.

Figure 8:
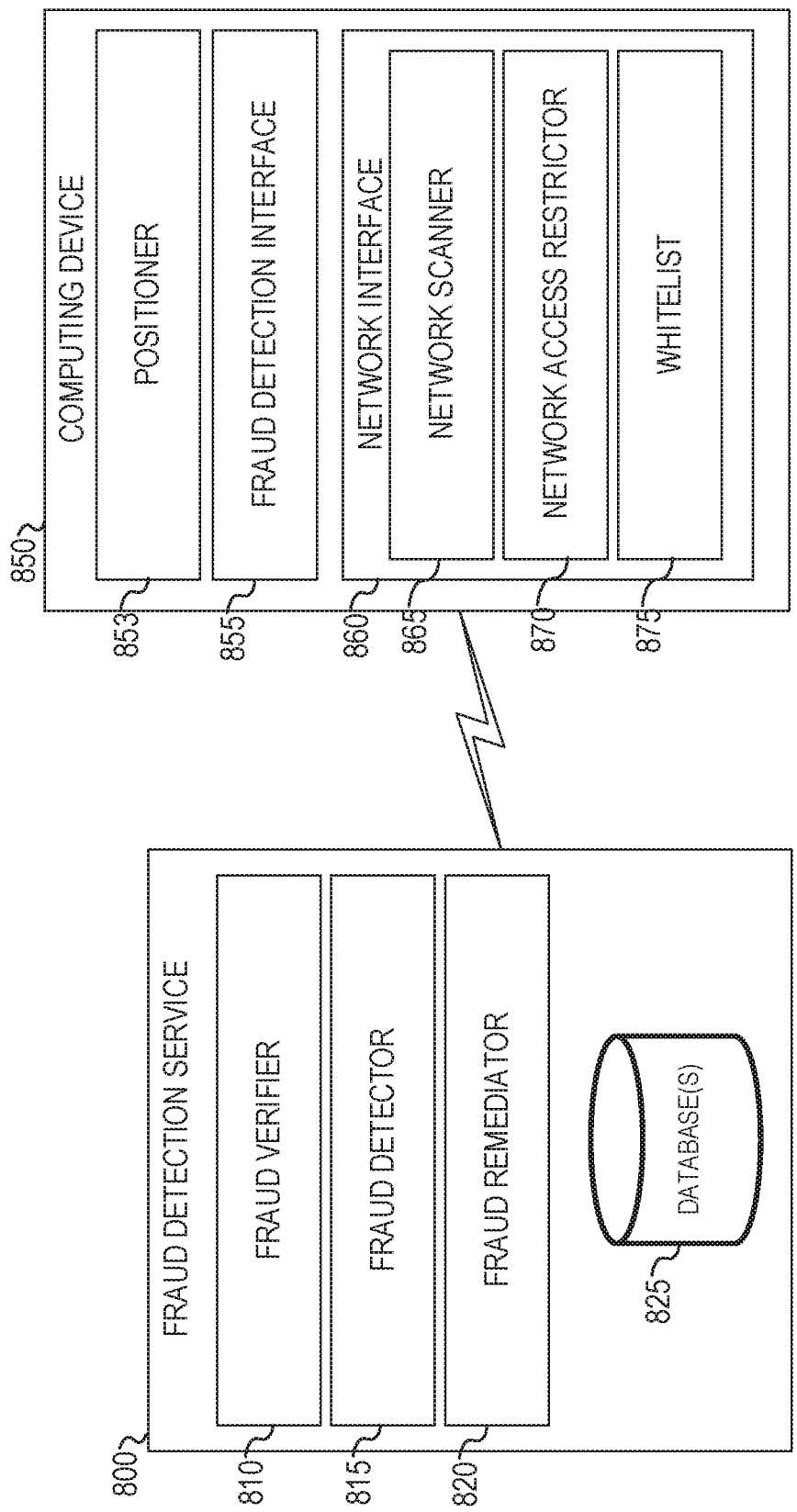
FIG. 8 illustrates a block diagram of a fraud detection service and a computing device according to some examples of the present disclosure.

FIG. 8 illustrates a block diagram of a fraud detection service 800 and a computing device 850 according to some examples of the present disclosure. Fraud detection service 800 may be an example of fraud detection service 120. Computing device 850 may be an example of computing device 122 and 132. The components shown in FIGS. 8 and 9 may be performed in hardware, software, or any combination thereof. The functionality of each component is one example arrangement of functionality and one of ordinary skill with the benefit of the present disclosure will appreciate that other organizations are possible. For example, one or more of the functions of one or more components of the fraud detection service 800 may be performed by one or more of the other components. Likewise, one or more of the functions of one or more components of the computing device 850 may be performed by one or more of the other components. Fraud detection service 800 may execute on a network accessible computing device, such as a server, a desktop, a laptop, or the like. Computing device 850 may be any computing device that is capable of performing instructions and connecting to one or more wireless access points. Example computing devices include desktops, laptops, tablets, smartphones, other access points (e.g., performing the role of a computing device), and the like.

Computing device 850 may include a network interface 860. The network interface 860 may provide one or more software and/or hardware components to enable the computing device to associate, authenticate, and connect to a wireless access point. This includes network stacks, such as Transmission Control Protocol (TCP). Internet Protocol, Ethernet, one or more protocol layers specified by the an 802.11 family of standards promulgated by the Institute for Electrical and Electronics Engineers (IEEE), and the like. As used herein, access points and computing devices may communicate, authenticate, associate, connect and otherwise operate according to an IEEE 802.11 family of standards, such as 802.11 ac.

Network interface 860 may also include a whitelist 875 that identifies one or more access points that the computing device is authorized to connect with. The whitelist may be a list of access points in a particular network, such as a corporate network. In some examples, the network interface 860 may limit the scan for access point beacon frames of access points identified in the whitelist 875. Whitelist 875 may identify access points by an access point identifier that may comprise one or more of: an SSID, a MAC address, or the like.

Network scanner 865 of network interface 860 may scan for one or more access points. For example, by listening at designated frequencies and according to designated protocols such as an 802.11 protocol for beacon frames sent by access points. In some examples, the network scanner 865 may filter out access points that are not in the whitelist based upon the identification of the access point in the white list. In some examples, the network scanner 865 may perform one or more measurements of the radio interface between the access points that are scanned and the computing device. For example, a received signal strength (which may be described by a received signal strength indicator or RSSI), a round-trip time, and the like. In some examples, the network scanner 865 may associate and/or authenticate with one or more access points to perform the measurements.

Once the computing device is connected to an access point (e.g., associated and/or authenticated), the network access restrictor 870 may restrict the network access of the computing device 850 until the fraud detection process has completed and the access point that the computing device 850 is connected to is cleared as being non-anomalous, e.g., by fraud detection service 800.

Fraud detection interface 855 may receive the whitelist 875 from the fraud detection service 800 or from another component and store it on the computing device 850. Fraud detection interface 855 may send reports to the fraud detection service 800 comprising the list of access points detected (e.g., that are visible) by the computing device 850 (e.g., by network scanner 865 of computing device 850) and in some examples, one or more of: measurement reports; a geolocation; or an approximate location of the computing device 850. Fraud detection interface 855 may also receive an indication of whether or not the access point that the computing device 850 is currently connected to is considered anomalous. If the current access point is not anomalous, then the fraud detection interface 855 may instruct the network access restrictor 870 to allow full access. Otherwise, the fraud detection interface 855 may connect to a different access point or maintain the restricted access. Fraud detection interface 855 may also handle any requested verification from fraud detection service 800. For example, fraud detection service 800 may request that computing device 850 verify an access point. The computing device may receive the beacon frames from the access point and forward them to the fraud detection service 800 for analysis.

Positioner 853 may include hardware and/or software for determining a geolocation of the computing device 850. For example, a GNSS receiver and corresponding software to compute a position of the computing device. Other position calculations may include use of cellular networks to trilaterate the position of the computing device.

Fraud detection service 800 may include a fraud detector 815 which may receive reports from computing devices, compute the access point positioning data (if needed—e.g., for probabilistic modeling), determine if an access point is anomalous, compute fraud scores, and the like. For example, fraud detector 815 may perform any one of the methods of FIGS. 2-7. Fraud verifier 810 may verify whether an access point that was labeled as anomalous by the fraud detector 815 is being impersonated. For example, the fraud verifier 810 may have a network address of the legitimate access point and may send a request to the access point to broadcast a code or other message within its beacon frame. This code may be a cryptographic code, such as an HMAC or other key that may include a time value or counter value to prevent duplication. This time value and/or counter may be encrypted to prevent snooping. If the computing device reports that the secret value is present in the beacon, the access point may be labeled as not anomalous.

Fraud remediator 820 may take one or more corrective actions to remediate any potential anomalous access points. For example, by commanding a legitimate access point that is being impersonated to change the identification of the legitimate access point, updating the white list with the legitimate access point, and propagating the updated white list to the computing devices, such as computing device 850. Other corrective actions include informing an administrator, including a location of the imposter access point, and the like. In some examples, the fraud detection service 800 may instruct another device to issue a denial of service attack on the illegitimate access point so as to use up the resources of the illegitimate access point and prevent legitimate clients from connecting and potentially sending sensitive data that may be intercepted. Database 825 may store the access point positioning data, measurement reports, and the like.

Figure 9:
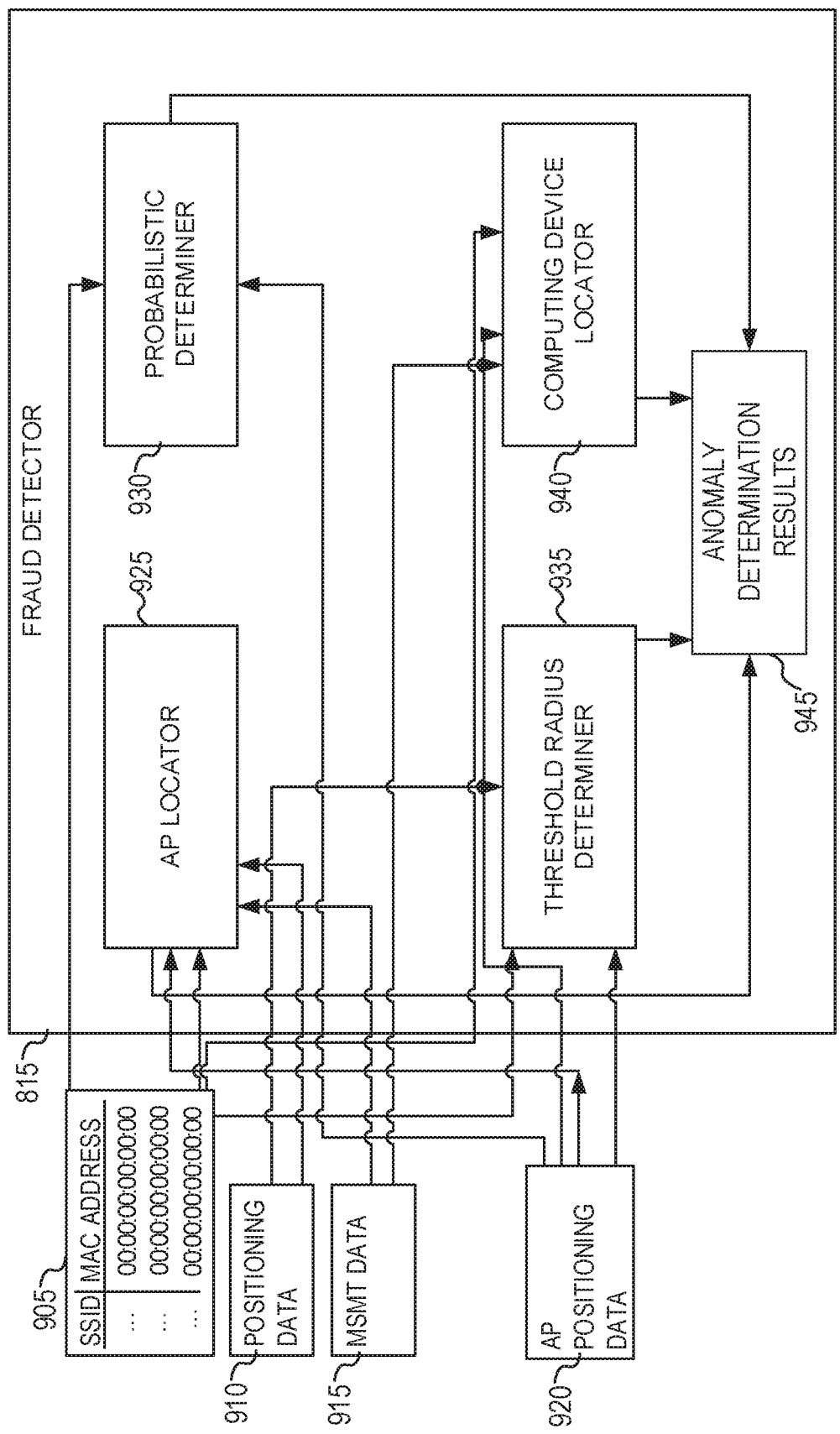
FIG. 9 illustrates a schematic of a fraud detector according to some examples of the present disclosure.

FIG. 9 illustrates a more detailed example schematic of a fraud detector 815 according to some examples of the present disclosure. In some examples, the components of the fraud detector 815 may vary depending upon the implementation. For example, fewer, greater, or different components than illustrated may be utilized. Access point locator 925 may utilize the list of visible access points 905, the positioning data 910 of the computing device, measurement data 915 of the visible access points 905 and the AP positioning data 920 to calculate access points that are visible that should not be visible by calculating an observed position of each visible access point and then comparing that with the AP positioning data 920 which indicates expected positions. For example, according to FIG. 3. The output is the anomaly determination 945.

Probabilistic determiner 930 may utilize the list of visible access points 905 and the access point positioning data 920 (in the form of a probability model) to determine whether a visibility of a particular access point in the list of visible access points is not probable. If the probability of the access point being visible given the other access points is below a threshold probability, the access point may be marked as anomalous. For example, probabilistic determiner 930 may implement the method of FIG. 5.

Threshold radius determiner 935 may utilize the access point positioning data 920 and positioning data 910 of the computing device and the visible access points 905 to determine a set of access points that should be visible given a current location of the computing device and the AP positioning data 920 by selecting access points in the visible list that are within a threshold distance of the computing device. APs in the visible access points 905 that are not in the set of access points that should be visible may be marked as anomalous. In some examples, instead of utilizing a position of the computing device, the threshold radius determiner may calculate a center access point and utilize a threshold distance from the location of that access point to determine the set of access points that should be visible to the computing device. For example, threshold radius determiner 935 may implement FIG. 4. In some examples, the threshold radius determiner 935 may also implement FIG. 6 and may not take as input the location of the computing device.

Computing device locator 940 may utilize the AP positioning data 920, measurement data 915 and the list of visible access points 905 to attempt to determine a position of the computing device. The trilateration equations used may have an error value or may not converge on a solution if an access point in the visible list is not where the data in the AP positioning data indicates it is. Access points that cause a failure or high error rate of the trilateration equations may be labeled as anomalous. Computing device locator 940 may implement the method of FIG. 7.

AP locator 925, probabilistic determiner 930, threshold radius determiner 935 and computing device locator 940 may return anomaly determination results 945 which may be utilized with other components of fraud detection service to mitigate and/or confirm a designation that an access point is anomalous. In some examples, one or more of these methods may be run depending on the data available to the fraud detector 815. In some examples, one, more, or all of them may be run and the anomaly determination results from multiple of the components may be combined. For example, each result may be weighted and summed. Weights maybe determined based upon an administrator, or may be determined based upon a regression machine learned model (e.g., logistic regression) that is trained with historical or determined reports from computing devices and labelled with indications of whether or not the access point is fraudulent.

Figure 10:
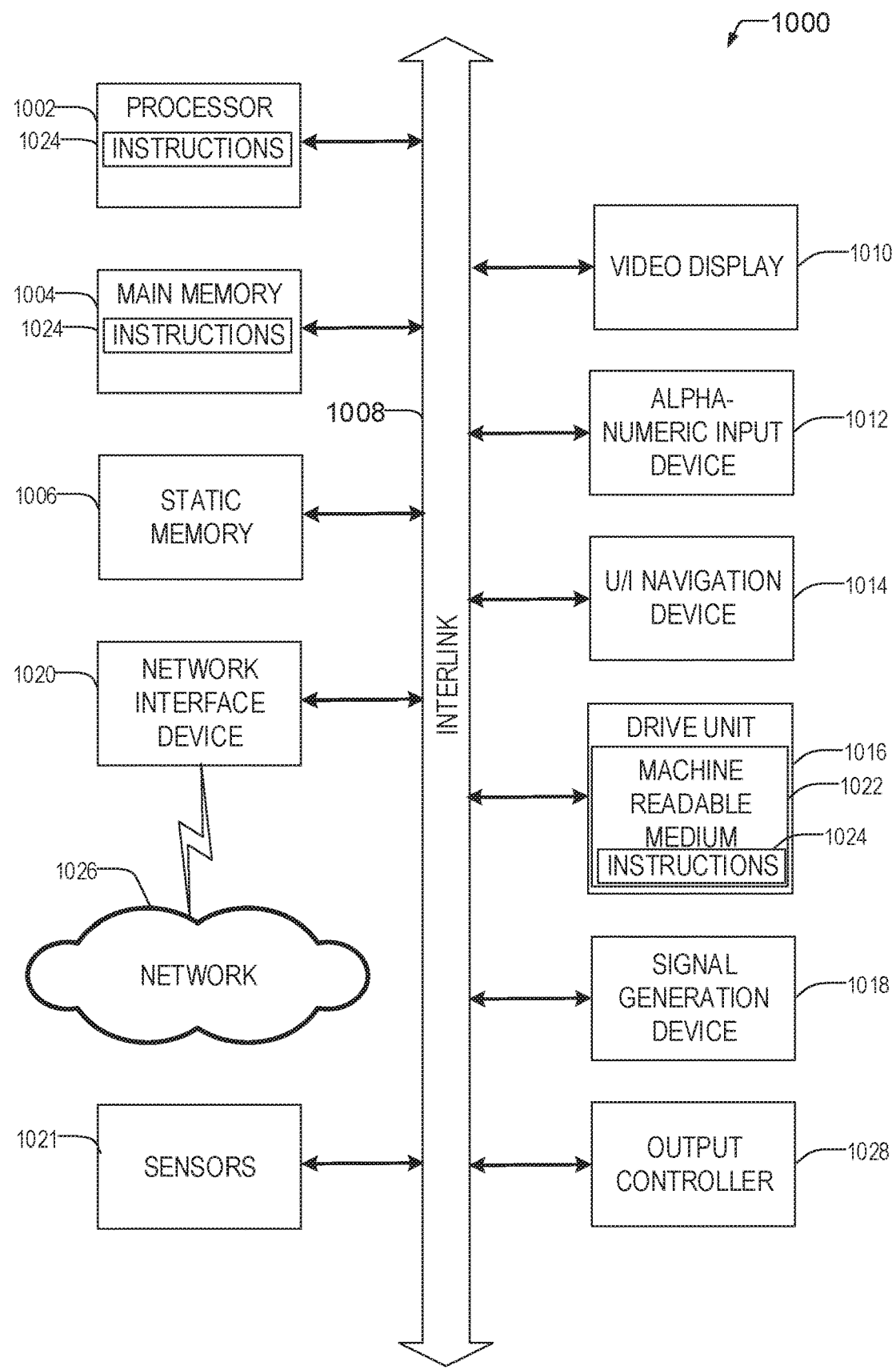
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a computing device such as a personal computer (PC), a tablet PC, a set-top box (STB), a personal digital assistant (PDA), a mobile telephone, a server implementing a fraud detection service, a smart phone, a web appliance, a network router, an access point, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 1000 may implement the methods of FIGS. 1-7, implement the components of fraud detection service 800, and computing device 850 and fraud detector 815 of FIG. 9.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks: magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1024 may further be transmitted or received over a communications network 1026 using a transmission medium via the network interface device 1020. The Machine 1000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®. IEEE 802.16 family of standards known as WiMax®). IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques.

OTHER NOTES AND EXAMPLES

Example 1 is a method for detecting fraudulent network access points, the method comprising: using one or more hardware processors: determining a set of network access points visible to a first computing device; determining that a first network access point in the set of network access points is broadcasting from a location that is not an expected location based upon the set of network access points and access point positioning data describing position information of the set of network access points; storing an indication that the first network access point is suspected as being anomalous based upon the determination that the first network access point is broadcasting from a location that is not an expected location; and initiating at least one corrective action based upon the indication that the access point is anomalous.

In Example 2, the subject matter of Example 1 includes, wherein determining that a first network access point in the set of network access points is broadcasting from a location that is not an expected location comprises: identifying a location of the first computing device; identifying a measurement report measuring a strength of a signal between the computing device and the first network access point; calculating an observed position of the first network access point based upon the measurement report and other measurement reports from other computing devices other than the first computing device; and determining that the observed position of the first network access point is not within a threshold distance of a position of the first network access point described by the access point positioning data.

In Example 3, the subject matter of Example 2 includes, wherein determining a location of the computing device comprises receiving the location from the first computing device.

In Example 4, the subject matter of Examples 1-3 includes, wherein determining that a first network access point in the set of network access points is broadcasting from a location that is not an expected location comprises: identifying a location of the first computing device; and determining that the first network access point is not within a threshold distance of the expected location of the first network access point based upon the access point positioning data.

In Example 5, the subject matter of Examples 1-4 includes, wherein the access point positioning data comprises a probability model that comprises probabilities of seeing an access point in the sets of network access points visible to the first computing device given that at least one other access point in the sets of access points visible to the first computing device is visible; and wherein determining that a first network access point in the set of network access points is broadcasting from a location that is not an expected location comprises determining that the probability of seeing the first network access point given the set of network access points visible to the first computing device is below a threshold probability.

In Example 6, the subject matter of Example 5 includes, wherein the probability model is created based upon a plurality of sets of network access points reported as visible from a plurality of computing devices.

In Example 7, the subject matter of Examples 1-6 includes, wherein determining that the first network access point in the set of network access points is broadcasting from location that is not an expected location comprises: identifying a center access point in the set of access points visible to the first computing device; identifying a location of the center access point using the access point positioning data; and determining that the first network access point is not within a threshold distance of the location of the center access point.

In Example 8, the subject matter of Examples 1-7 includes, wherein determining that a first network access point in the set of network access points is broadcasting from a location that is not an expected location comprises: identifying a measurement report measuring a strength of a signal between the first computing device and the first network access point; calculating a plurality of positions of the computing device using a trilateration algorithm based upon the measurement report and other measurement reports from other computing devices for varying combinations of three access points in the set of network access points visible to the first computing device; and wherein determining that a first network access point in the set of network access points is broadcasting from a location that is not an expected location comprises determining that at least one of a plurality of positions involving the first network access point exceeded an error threshold.

In Example 9, the subject matter of Examples 1-8 includes, wherein storing the indication comprises storing a fraud score corresponding to the first network access point, and wherein initiating at least one corrective action comprises initiating at least one corrective action when the fraud score exceeds a configured threshold.

In Example 10, the subject matter of Examples 1-9 includes, wherein initiating the at least one corrective action comprises: transmitting an indication to the first computing device that the first network access point is anomalous.

In Example 11, the subject matter of Examples 1-10 includes, wherein initiating the at least one corrective action comprises adding the first network access point to a blacklist.

In Example 12, the subject matter of Examples 1-11 includes, wherein initiating the at least one corrective action comprises instructing a legitimate network access point with an identifier matching an identifier of the first network access point that was labeled as anomalous to change its identifier.

In Example 13, the subject matter of Examples 1-12 includes, wherein the set of network access points visible to the first computing device comprises network access points within wireless range of the first computing device that were identified from an access point scan.

In Example 14, the subject matter of Examples 1-13 includes, wherein the set of network access points visible to the first computing device comprises a set of Media Access Control (MAC) addresses.

In Example 15, the subject matter of Examples 1-14 includes, wherein the set of network access points visible to the first computing device comprises a set of Service Set Identifications (SSID).

In Example 16, the subject matter of Examples 1-15 includes, wherein the set of network access points visible to the first computing device comprises a set of MAC address and SSID pairs.

Example 17 is a machine-readable medium for detecting fraudulent network access points, the computer-readable medium comprising instructions, which when executed by a machine, cause the machine to perform operations comprising: determining a set of network access points visible to a first computing device; determining that a first network access point in the set of network access points is broadcasting from a location that is not an expected location based upon the set of network access points and access point positioning data describing position information of the set of network access points; storing an indication that the first network access point is suspected as being anomalous based upon the determination that the first network access point is broadcasting from a location that is not an expected location; and initiating at least one corrective action based upon the indication that the access point is anomalous.

In Example 18, the subject matter of Example 17 includes, wherein the operations of determining that a first network access point in the set of network access points is broadcasting from a location that is not an expected location comprises: identifying a location of the first computing device; identifying a measurement report measuring a strength of a signal between the computing device and the first network access point; calculating an observed position of the first network access point based upon the measurement report and other measurement reports from other computing devices other than the first computing device: and determining that the observed position of the first network access point is not within a threshold distance of a position of the first network access point described by the access point positioning data.

In Example 19, the subject matter of Example 18 includes, wherein the operations of determining a location of the computing device comprises receiving the location from the first computing device.

In Example 20, the subject matter of Examples 17-19 includes, wherein the operations of determining that a first network access point in the set of network access points is broadcasting from a location that is not an expected location comprises: identifying a location of the first computing device; and determining that the first network access point is not within a threshold distance of the expected location of the first network access point based upon the access point positioning data.

In Example 21, the subject matter of Examples 17-20 includes, wherein the operations further comprise: wherein the access point positioning data comprises a probability model that comprises probabilities of seeing an access point in the sets of network access points visible to the first computing device given that at least one other access point in the sets of access points visible to the first computing device is visible; and wherein the operations of determining that a first network access point in the set of network access points is broadcasting from a location that is not an expected location comprises determining that the probability of seeing the first network access point given the set of network access points visible to the first computing device is below a threshold probability.

In Example 22, the subject matter of Example 21 includes, wherein the probability model is created based upon a plurality of sets of network access points reported as visible from a plurality of computing devices.

In Example 23, the subject matter of Examples 17-22 includes, wherein determining that the first network access point in the set of network access points is broadcasting from location that is not an expected location comprises: identifying a center access point in the set of access points visible to the first computing device; identifying a location of the center access point using the access point positioning data; and determining that the first network access point is not within a threshold distance of the location of the center access point.

In Example 24, the subject matter of Examples 17-23 includes, wherein the operations of determining that a first network access point in the set of network access points is broadcasting from a location that is not an expected location comprises: identifying a measurement report measuring a strength of a signal between the first computing device and the first network access point; calculating a plurality of positions of the computing device using a trilateration algorithm based upon the measurement report and other measurement reports from other computing devices for varying combinations of three access points in the set of network access points visible to the first computing device; and wherein determining that a first network access point in the set of network access points is broadcasting from a location that is not an expected location comprises determining that at least one of a plurality of positions involving the first network access point exceeded an error threshold.

In Example 25, the subject matter of Examples 17-24 includes, wherein the operations of storing the indication comprises storing a fraud score corresponding to the first network access point, and wherein the operations of initiating at least one corrective action comprises initiating at least one corrective action when the fraud score exceeds a configured threshold.

In Example 26, the subject matter of Examples 17-25 includes, wherein the operations of initiating the at least one corrective action comprises: transmitting an indication to the first computing device that the first network access point is anomalous.

In Example 27, the subject matter of Examples 17-26 includes, wherein the operations of initiating the at least one corrective action comprises adding the first network access point to a blacklist.

In Example 28, the subject matter of Examples 17-27 includes, wherein the operations of initiating the at least one corrective action comprises instructing a legitimate network access point with an identifier matching an identifier of the first network access point that was labeled as anomalous to change its identifier.

In Example 29, the subject matter of Examples 17-28 includes, wherein the set of network access points visible to the first computing device comprises network access points within wireless range of the first computing device that were identified from an access point scan.

In Example 30, the subject matter of Examples 17-29 includes, wherein the set of network access points visible to the first computing device comprises a set of Media Access Control (MAC) addresses.

In Example 31, the subject matter of Examples 17-30 includes, wherein the set of network access points visible to the first computing device comprises a set of Service Set Identifications (SSID).

In Example 32, the subject matter of Examples 17-31 includes, wherein the set of network access points visible to the first computing device comprises a set of MAC address and SSID pairs.

Example 33 is a device for detecting fraudulent network access points, the device comprising: a hardware processor; a memory, including instructions, which when executed, cause the hardware processor to perform operations comprising: determining a set of network access points visible to a first computing device; determining that a first network access point in the set of network access points is broadcasting from a location that is not an expected location based upon the set of network access points and access point positioning data describing position information of the set of network access points: storing an indication that the first network access point is suspected as being anomalous based upon the determination that the first network access point is broadcasting from a location that is not an expected location; and initiating at least one corrective action based upon the indication that the access point is anomalous.

In Example 34, the subject matter of Example 33 includes, wherein the operations of determining that a first network access point in the set of network access points is broadcasting from a location that is not an expected location comprises: identifying a location of the first computing device; identifying a measurement report measuring a strength of a signal between the computing device and the first network access point; calculating an observed position of the first network access point based upon the measurement report and other measurement reports from other computing devices other than the first computing device; and determining that the observed position of the first network access point is not within a threshold distance of a position of the first network access point described by the access point positioning data.

In Example 35, the subject matter of Example 34 includes, wherein the operations of determining a location of the computing device comprises receiving the location from the first computing device.

In Example 36, the subject matter of Examples 33-35 includes, wherein the operations of determining that a first network access point in the set of network access points is broadcasting from a location that is not an expected location comprises: identifying a location of the first computing device; and determining that the first network access point is not within a threshold distance of the expected location of the first network access point based upon the access point positioning data.

In Example 37, the subject matter of Examples 33-36 includes, wherein the operations further comprise: wherein the access point positioning data comprises a probability model that comprises probabilities of seeing an access point in the sets of network access points visible to the first computing device given that at least one other access point in the sets of access points visible to the first computing device is visible; and wherein the operations of determining that a first network access point in the set of network access points is broadcasting from a location that is not an expected location comprises determining that the probability of seeing the first network access point given the set of network access points visible to the first computing device is below a threshold probability.

In Example 38, the subject matter of Example 37 includes, wherein the probability model is created based upon a plurality of sets of network access points reported as visible from a plurality of computing devices.

In Example 39, the subject matter of Examples 33-38 includes, wherein determining that the first network access point in the set of network access points is broadcasting from location that is not an expected location comprises: identifying a center access point in the set of access points visible to the first computing device; identifying a location of the center access point using the access point positioning data; and determining that the first network access point is not within a threshold distance of the location of the center access point.

In Example 40, the subject matter of Examples 33-39 includes, wherein the operations of determining that a first network access point in the set of network access points is broadcasting from a location that is not an expected location comprises: identifying a measurement report measuring a strength of a signal between the first computing device and the first network access point; calculating a plurality of positions of the computing device using a trilateration algorithm based upon the measurement report and other measurement reports from other computing devices for varying combinations of three access points in the set of network access points visible to the first computing device; and wherein determining that a first network access point in the set of network access points is broadcasting from a location that is not an expected location comprises determining that at least one of a plurality of positions involving the first network access point exceeded an error threshold.

In Example 41, the subject matter of Examples 33-40 includes, wherein the operations of storing the indication comprises storing a fraud score corresponding to the first network access point, and wherein the operations of initiating at least one corrective action comprises initiating at least one corrective action when the fraud score exceeds a configured threshold.

In Example 42, the subject matter of Examples 33-41 includes, wherein the operations of initiating the at least one corrective action comprises: transmitting an indication to the first computing device that the first network access point is anomalous.

In Example 43, the subject matter of Examples 33-42 includes, wherein the operations of initiating the at least one corrective action comprises adding the first network access point to a blacklist.

In Example 44, the subject matter of Examples 33-43 includes, wherein the operations of initiating the at least one corrective action comprises instructing a legitimate network access point with an identifier matching an identifier of the first network access point that was labeled as anomalous to change its identifier.

In Example 45, the subject matter of Examples 33-44 includes, wherein the set of network access points visible to the first computing device comprises network access points within wireless range of the first computing device that were identified from an access point scan.

In Example 46, the subject matter of Examples 33-45 includes, wherein the set of network access points visible to the first computing device comprises a set of Media Access Control (MAC) addresses.

In Example 47, the subject matter of Examples 33-46 includes, wherein the set of network access points visible to the first computing device comprises a set of Service Set Identifications (SSID).

In Example 48, the subject matter of Examples 33-47 includes, wherein the set of network access points visible to the first computing device comprises a set of MAC address and SSID pairs.

Example 49 is a device for detecting fraudulent network access points, the device comprising: means for determining a set of network access points visible to a first computing device; means for determining that a first network access point in the set of network access points is broadcasting from a location that is not an expected location based upon the set of network access points and access point positioning data describing position information of the set of network access points; means for storing an indication that the first network access point is suspected as being anomalous based upon the determination that the first network access point is broadcasting from a location that is not an expected location; and means for initiating at least one corrective action based upon the indication that the access point is anomalous.

In Example 50, the subject matter of Example 49 includes, wherein the means for determining that a first network access point in the set of network access points is broadcasting from a location that is not an expected location comprises: means for identifying a location of the first computing device; means for identifying a measurement report measuring a strength of a signal between the computing device and the first network access point; means for calculating an observed position of the first network access point based upon the measurement report and other measurement reports from other computing devices other than the first computing device; and means for determining that the observed position of the first network access point is not within a threshold distance of a position of the first network access point described by the access point positioning data.

In Example 51, the subject matter of Example 50 includes, wherein the means for determining a location of the computing device comprises receiving the location from the first computing device.

In Example 52, the subject matter of Examples 49-51 includes, wherein the means for determining that a first network access point in the set of network access points is broadcasting from a location that is not an expected location comprises: means for identifying a location of the first computing device: and means for determining that the first network access point is not within a threshold distance of the expected location of the first network access point based upon the access point positioning data.

In Example 53, the subject matter of Examples 49-52 includes, wherein the access point positioning data comprises a probability model that comprises probabilities of seeing an access point in the sets of network access points visible to the first computing device given that at least one other access point in the sets of access points visible to the first computing device is visible; and wherein the means for determining that a first network access point in the set of network access points is broadcasting from a location that is not an expected location comprises determining that the probability of seeing the first network access point given the set of network access points visible to the first computing device is below a threshold probability.

In Example 54, the subject matter of Example 53 includes, wherein the probability model is created based upon a plurality of sets of network access points reported as visible from a plurality of computing devices.

In Example 55, the subject matter of Examples 49-54 includes, wherein determining that the first network access point in the set of network access points is broadcasting from location that is not an expected location comprises: means for identifying a center access point in the set of access points visible to the first computing device; means for identifying a location of the center access point using the access point positioning data; and means for determining that the first network access point is not within a threshold distance of the location of the center access point.

In Example 56, the subject matter of Examples 49-55 includes, wherein the means for determining that a first network access point in the set of network access points is broadcasting from a location that is not an expected location comprises: means for identifying a measurement report measuring a strength of a signal between the first computing device and the first network access point; means for calculating a plurality of positions of the computing device using a trilateration algorithm based upon the measurement report and other measurement reports from other computing devices for varying combinations of three access points in the set of network access points visible to the first computing device; and means for wherein determining that a first network access point in the set of network access points is broadcasting from a location that is not an expected location comprises determining that at least one of a plurality of positions involving the first network access point exceeded an error threshold.

In Example 57, the subject matter of Examples 49-56 includes, wherein the means for storing the indication comprises means for storing a fraud score corresponding to the first network access point, and wherein initiating at least one corrective action comprises initiating at least one corrective action when the fraud score exceeds a configured threshold.

In Example 58, the subject matter of Examples 49-57 includes, wherein the means for initiating the at least one corrective action comprises: means for transmitting an indication to the first computing device that the first network access point is anomalous.

In Example 59, the subject matter of Examples 49-58 includes, wherein the means for initiating the at least one corrective action comprises means for adding the first network access point to a blacklist.

In Example 60, the subject matter of Examples 49-59 includes, wherein the means for initiating the at least one corrective action comprises means for instructing a legitimate network access point with an identifier matching an identifier of the first network access point that was labeled as anomalous to change its identifier.

In Example 61, the subject matter of Examples 49-60 includes, wherein the set of network access points visible to the first computing device comprises network access points within wireless range of the first computing device that were identified from an access point scan.

In Example 62, the subject matter of Examples 49-61 includes, wherein the set of network access points visible to the first computing device comprises a set of Media Access Control (MAC) addresses.

In Example 63, the subject matter of Examples 49-62 includes, wherein the set of network access points visible to the first computing device comprises a set of Service Set Identifications (SSID).

In Example 64, the subject matter of Examples 49-63 includes, wherein the set of network access points visible to the first computing device comprises a set of MAC address and SSID pairs.

Example 65 is at least one machine-readable medium including instructions that, when executed by processing circuitry, cause the processing circuitry to perform operations to implement of any of Examples 1-64.

Example 66 is an apparatus comprising means to implement of any of Examples 1-64.

Example 67 is a system to implement of any of Examples 1-64.

Example 68 is a method to implement of any of Examples 1-64.

What is claimed is:

1. A device for detecting fraudulent network access points, the device comprising:
    a hardware processor;
    a memory, including instructions, which when executed, cause the hardware processor to perform operations comprising:
        determining a set of a plurality of network access points currently in wireless range to a first computing device, the first computing device determining the set by receiving wireless signals from each of the network access points in the set;
        determining that a first network access point in the set of network access points is broadcasting from a location that is not an expected location based upon a comparison of the set of network access points that are currently in wireless range to the first computing device and access point positioning data describing position information of the set of network access points that are within wireless range to the first computing device, the access point positioning data comprising, for each particular access point in the set of the plurality of network access points, relative location data that describes probabilities that the particular access point is within wireless range of the first computing device given a set of other access points that are within wireless range of the first computing device;
        storing an indication that the first network access point is suspected as being anomalous based upon the determination that the first network access point is broadcasting from a location that is not an expected location; and
        initiating at least one corrective action based upon the indication that the first network access point is anomalous.

2. The device of claim 1,
    wherein the operations of determining that a first network access point in the set of network access points is broadcasting from a location that is not an expected location comprises determining that the probability of being within wireless range of the first network access point given the set of network access points being within wireless range to the first computing device is below a threshold probability based upon the probabilities of the relative location data.

3. The device of claim 2, wherein the relative location data is a probability model that is created based upon a plurality of sets of network access points reported as visible from a plurality of computing devices.

4. A method for detecting fraudulent network access points, the method comprising:
    using one or more hardware processors:
    determining a set of a plurality of network access points currently in wireless range to a first computing device, the first computing device determining the set by receiving wireless signals from each of the network access points in the set;
    determining that a first network access point in the set of network access points is broadcasting from a location that is not an expected location based upon a comparison of the set of network access points that are currently in wireless range to the first computing device and access point positioning data describing position information of the set of network access points that are within wireless range to the first computing device, the access point positioning data comprising, for each particular access point in the set of the plurality of network access points relative location data that describes probabilities that the particular access point is within wireless range of the first computing device given a set of other access points that are within wireless range of the first computing device;
    storing an indication that the first network access point is suspected as being anomalous based upon the determination that the first network access point is broadcasting from a location that is not an expected location; and
    initiating at least one corrective action based upon the indication that the first network access point is anomalous.

5. The method of claim 4,
    wherein the operations of determining that a first network access point in the set of network access points is broadcasting from a location that is not an expected location comprises determining that the probability of being within wireless range of the first network access point given the set of network access points being within wireless range to the first computing device is below a threshold probability based upon the probabilities of the relative location data.

6. The method of claim 4, wherein the relative location data is a probability model that is created based upon a plurality of sets of network access points reported as visible from a plurality of computing devices.

7. The method of claim 4, wherein initiating the at least one corrective action comprises:
    transmitting an indication to the first computing device that the first network access point is anomalous.

8. The method of claim 4, wherein initiating the at least one corrective action comprises adding the first network access point to a blacklist.

9. A device for detecting fraudulent network access points, the device comprising:
    means for determining a set of a plurality of network access points currently in wireless range to a first computing device, the first computing device determining the set by receiving wireless signals from each of the network access points in the set;
    means for determining that a first network access point in the set of network access points is broadcasting from a location that is not an expected location based upon a comparison of the set of network access points that are currently in wireless range to the first computing device and access point positioning data describing position information of the set of network access points that are within wireless range to the first computing device, the access point positioning data comprising, for each particular access point in the set of the plurality of network access points relative location data that describes probabilities that the particular access point is within wireless range of the first computing device given a set of other access points that are within wireless range of the first computing device; and
    means for initiating at least one corrective action based upon the determination that the first network access point is broadcasting from a location that is not an expected location.

10. The device of claim 1, wherein the operations further comprise:

responsive to determining that the first network access point is broadcasting from a location that is not an expected location, increasing a fraud score of the first network access point; and wherein initiating the at least one corrective action is responsive to the fraud score exceeding a threshold fraud score.

11. The device of claim 1, wherein the corrective action comprises changing a Service Set Identifier (SSID) of a legitimate network access point that the first network access point is impersonating.

12. The device of claim 1, wherein the operations further comprise:

identifying a network address for a legitimate network access point, the legitimate network access point may be the first network access point or another network access point, the network address for a network that is not a network for which the first network access point broadcasted the wireless signals received by the first computing device;

requesting the legitimate access point broadcast a code in a wireless signal;

requesting the first computing device to scan for the wireless signal;

determining if the wireless signal received by the first computing device includes the code; and wherein initiating the at least one corrective action is responsive to determining that the wireless signal received by the first computing device does not include the code.

13. The method of claim 4, wherein the method further comprises:

responsive to determining that the first network access point is broadcasting from a location that is not an expected location, increasing a fraud score of the first network access point; and wherein initiating the at least one corrective action is responsive to the fraud score exceeding a threshold fraud score.

14. The method of claim 4, wherein the corrective action comprises changing a Service Set Identifier (SSID) of a legitimate network access point that the first network access point is impersonating.

15. The method of claim 4, wherein the method further comprises:

identifying a network address for a legitimate network access point, the legitimate network access point may be the first network access point or another network access point, the network address for a network that is not a network for which the first network access point broadcasted the wireless signals received by the first computing device;

requesting the legitimate access point broadcast a code in a wireless signal;

requesting the first computing device to scan for the wireless signal;

determining if the wireless signal received by the first computing device includes the code; and wherein initiating the at least one corrective action is responsive to determining that the wireless signal received by the first computing device does not include the code.

16. The device of claim 9, further comprising:

means for, responsive to determining that the first network access point is broadcasting from a location that is not an expected location, increasing a fraud score of the first network access point; and wherein the means for initiating the at least one corrective action is responsive to the fraud score exceeding a threshold fraud score.

17. The device of claim 9, wherein the means for corrective action comprises means for changing a Service Set Identifier (SSID) of a legitimate network access point that the first network access point is impersonating.

18. The device of claim 9, wherein the device further comprises:

means for identifying a network address for a legitimate network access point, the legitimate network access point may be the first network access point or another network access point, the network address for a network that is not a network for which the first network access point broadcasted the wireless signals received by the first computing device;

means for requesting the legitimate access point broadcast a code in a wireless signal;

means for requesting the first computing device to scan for the wireless signal;

means for determining if the wireless signal received by the first computing device includes the code; and wherein the means for initiating the at least one corrective action is responsive to determining that the wireless signal received by the first computing device does not include the code.

* * * * *